United States Patent [19]

Seo et al.

[11] Patent Number: 5,495,373
[45] Date of Patent: Feb. 27, 1996

[54] REEL-GUIDE APPARATUS OF A MAGNETIC RECORDING/REPRODUCING APPARATUS HAVING CASSETTE REEL HOLDING CHASSIS WHICH IS LOWERED TO A POSITION ON A LOWER CHASSIS

[75] Inventors: Jae K. Seo; Do Y. Choi; Young H. Cho, all of Suwon, Rep. of Korea

[73] Assignee: Samsung Electronics Co., Ltd., Kyungki, Rep. of Korea

[21] Appl. No.: 280,612

[22] Filed: Jul. 26, 1994

[30] Foreign Application Priority Data

Jul. 26, 1993 [KR] Rep. of Korea .................. 93-14173

[51] Int. Cl.$^6$ ............................................ G11B 5/027
[52] U.S. Cl. ............................................ 360/85; 360/96.5
[58] Field of Search ................................... 360/85, 96.5

[56] References Cited

U.S. PATENT DOCUMENTS 5,191,493   3/1993   Tamura ............................ 360/85

FOREIGN PATENT DOCUMENTS

WO9321631   10/1993   WIPO ................ G11B 15/665

*Primary Examiner*—A. J. Heinz
*Attorney, Agent, or Firm*—Sughrue, Mion, Zinn, Macpeak & Seas

[57] ABSTRACT

A reel guide apparatus of a magnetic recording/reproducing apparatus accurately seats the supply reel and take-up reel onto a lower chassis of the apparatus. The reels are installed on a slider which is lowered to the lower chassis. Holes in the slider receive reel guide units for stably guiding the reels in the vertical direction. A position determining unit on the lower chassis accurately determines the seating of the tape cassette on the lower chassis. Sensors on the reel guide units and split disc reflectors on the reels facing the sensors result in the generation of reel pulses, which are used to determine remaining tape length, etc.

8 Claims, 7 Drawing Sheets

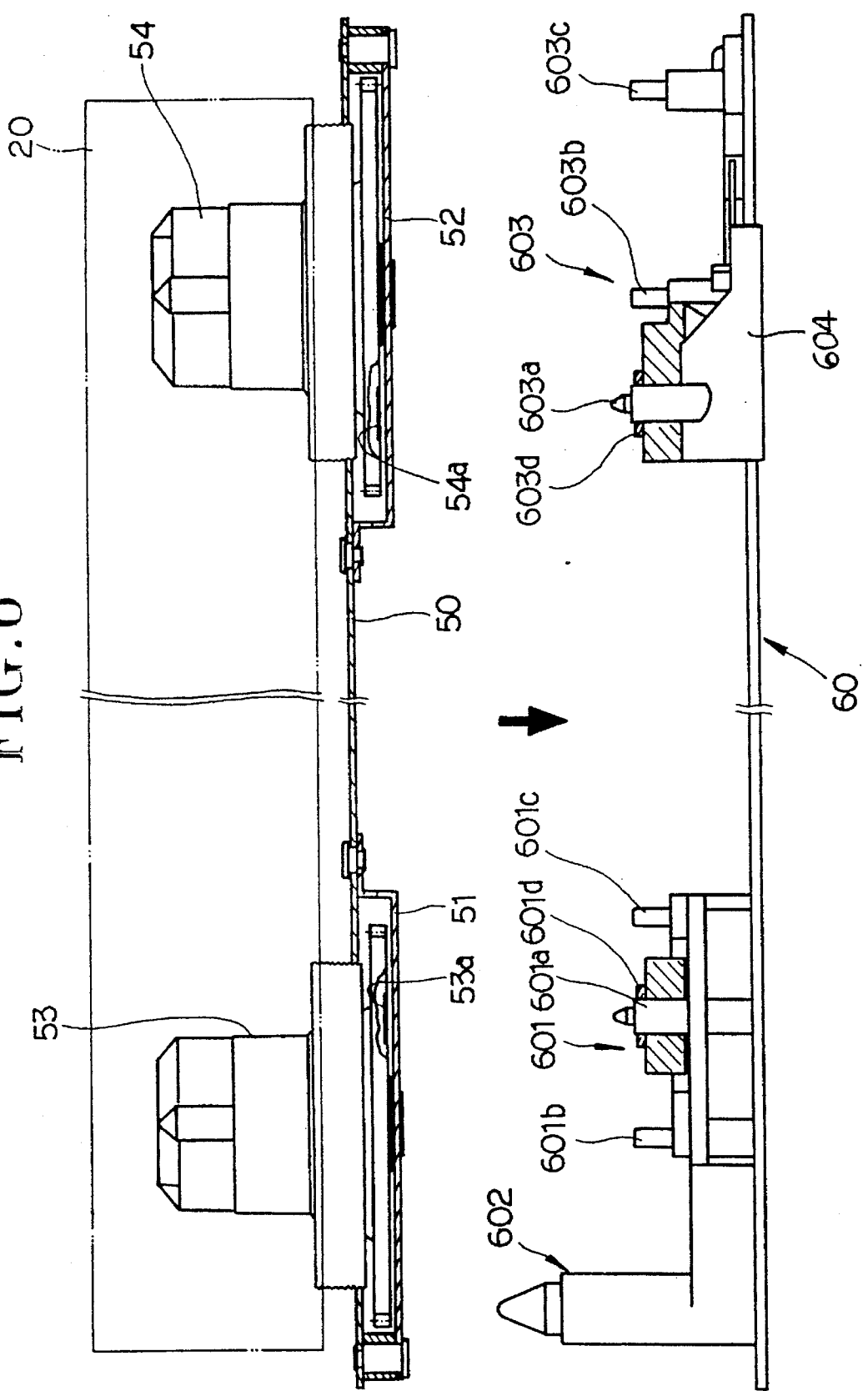

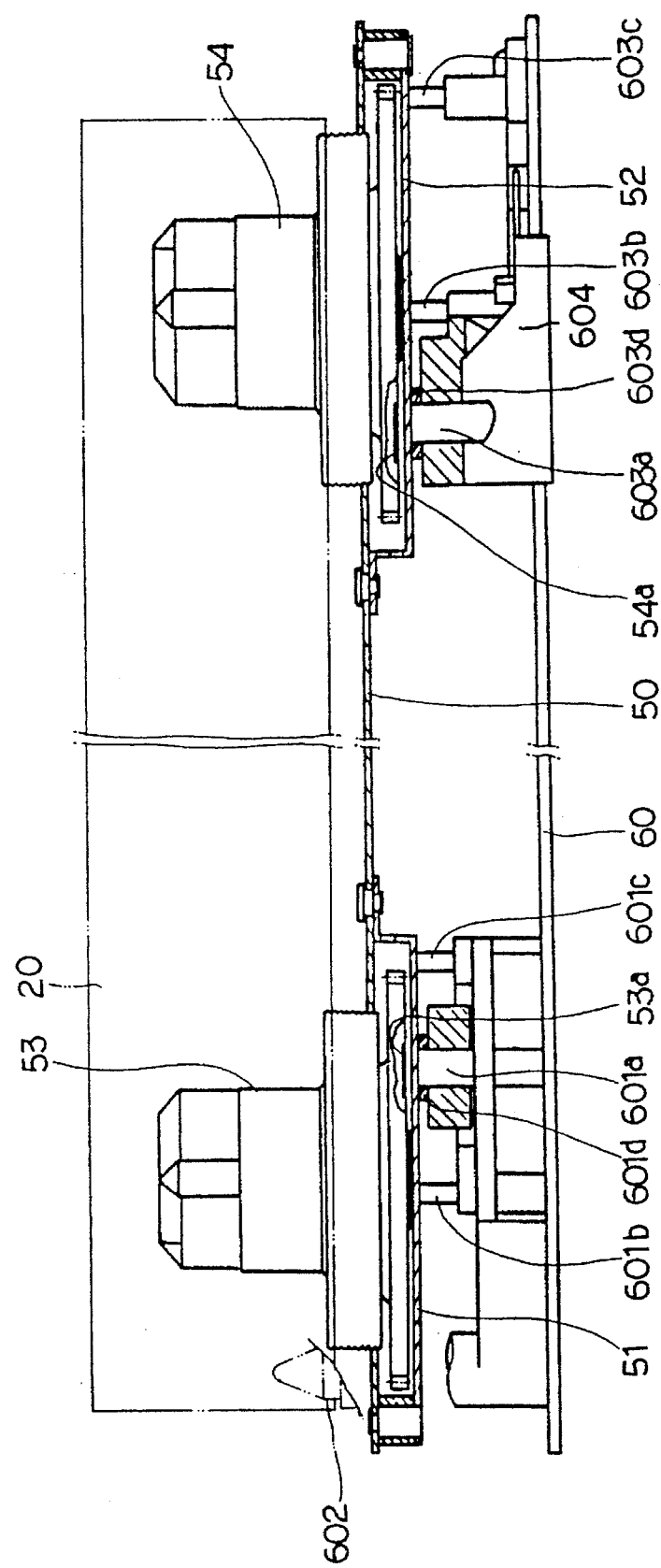

REEL-GUIDE APPARATUS OF A MAGNETIC RECORDING/REPRODUCING APPARATUS HAVING CASSETTE REEL HOLDING CHASSIS WHICH IS LOWERED TO A POSITION ON A LOWER CHASSIS

BACKGROUND OF THE INVENTION

1. Field of the Invention

The present invention relates to an apparatus for guiding a supply reel and a take-up reel of a magnetic recording/reproducing apparatus, and more particularly to a reel guide apparatus of a magnetic recorder/reproducer, wherein a supply reel and a take-up reel installed on a slider are accurately and stably placed on a lower chassis while generating accurate reel pulses.

2. Description of the Prior Art

Generally, magnetic recording/reproducing devices, such as a video tape recorder, are commonly in use today to the extent that they may be considered staple commodities. The most common household magnetic recording/reproducing devices utilize half inch tape cassettes and the standard VHS system and include a cassette holder which holds the tape cassette and driving members which pull the cassette holder into the interior of a main body thereof to seat the cassette holder on a main deck. In addition, the standard VHS device includes a unit which loads and unloads magnetic tape from the tape cassette onto and from a rotary drum installed on the main drum, and units for allowing the magnetic tape to travel along a predetermined path.

When the cassette is in the cassette holder, the insertion of the cassette holder is monitored to seat the tape cassette on the main deck. The magnetic tape is loaded by means of a pair of pole bases onto the rotary drum for recording signals on the magnetic tape or reproducing the signals previously recorded on the magnetic tape.

More recently, camcorders have been developed for use with 8 mm tape cassettes in order to provide video camera magnetic recorder/reproducer functions in a convenient and light weight package. As a result, many products are currently available that use an 8 mm tape cassette.

One major factor determining the weight and size of such devices is the size of the deck of the recording/reproducing device. As a result of research and development efforts, the inventors of the present invention previously developed a magnetic recording/reproducing device with a reduced size deck and simplified components. The latter device is described in Korean Patent Application No. 93-5016. In the latter device, a tape cassette is inserted into a cassette holder having a rotary drum, and the cassette holder is then pressed closed to fully load the magnetic tape. The rotary drum is completely held within the internal space of the tape cassette while the loading operation of the tape cassette is completed. This permits the deck to be very small. This apparatus will be briefly described below.

FIG. 1 is a side view showing the aforementioned magnetic recording/reproducing apparatus. An eject lever 10 is coupled to a pair of brackets 11 via a pair of lever arms 10a, extending from a rear portion of the eject lever 10, by means of a shaft 11a. The pair of brackets 11 are erected in the interior of a main body (not shown) of the apparatus. The eject lever 10 pivots about the shaft 11a to enable the opening/closing operation upward and downward. When a locking pin 10b, located on the front of the eject lever 10, is released, the eject lever pivots upward to expose it on the outside of the main body a predetermined angular amount. This permits one to insert or remove a tape cassette 20.

Also, a pair of elastic members 12, attached to the inner surface of the eject lever 10, press on the upper surface of the tape cassette 20 to hold the cassette tightly in the lever 10 when the pressing operation of the eject lever is completed. A pin 10c, provided in one side of the arm 10a of the eject lever 10, fits into an elongated hole 30b of a bracket 30a, which is erected on the side of an upper chassis 30. This construction causes the upper chassis 30 to move vertically upward and downward when the eject lever 10 swings upward and downward, respectively.

A cassette holder 40 for receiving the tape cassette 20, a slider 50 for forwardly and backwardly moving the cassette holder 40 in the horizontal direction, and the upper chassis 30 mounted with a rotary drum 31 for initially loading the magnetic tape during the horizontal movement of the slider 50 are provided inside of the eject lever 10. One end of the cassette holder 40 is connected to one end of the slider 50 by means of a shaft 40a. A first link 41, formed around the center of the slider 50, is connected to a second link 42, which by means of a pin 43 slides along an elongated hole 50b in a bracket 50a formed on the side of the slider 50. Therefore, the cassette holder 40 can swing around the shaft 40a by a predetermined angle to permit insertion and ejection of the tape cassette 20.

A lid-open member 44, which swings upward and downward about a shaft 44a at one end thereof, is installed on one side of the cassette holder 40. A pin 40b, projecting from the side of the cassette holder 40, fits within and is guided along an elongated hole 44b formed in approximately the center of the lid-open member 44. The center of the lid-open member 44 is coupled with the slider 50 by means of a third link 45 inclined at a predetermined angle. The second link 42 and the third link 45 are connected by an elastic member 46. Accordingly, during seating of the cassette holder 40 on the slider 50, the lid-open member 44 swings about the shaft 44 to open a lid 20a of the tape cassette 20.

A pair of reel bases 51 and 52, which support reels 53 and 54, are mounted on the slider 50. The reels 53 and 54 receive the hubs of the tape cassette 20. The forward and backward movement of the slider 50 in the horizontal direction is executed by means of a slider transportation apparatus (not shown) installed on the upper chassis.

A lower chassis 60, mounted with travelling elements for driving the magnetic tape within the tape cassette 20, is installed below the lower portion of the upper chassis 30. The upper chassis is moved up and down relative to the lower chassis 60 by means of a Scott Russel link mechanism principle. A pair of intersecting fourth and fifth links 60a and 60b are provided on the sides of the upper chassis and the lower chassis 60. The links include pins 60c projecting on the respective ends thereof for connecting the links to the upper and lower chassis. An elastic member 61 hooks respective links 60a and 60b together to result in the upper chassis being elastically moved in the up and down directions.

When the cassette holder 40a is closed after the tape cassette 20 is inserted in cassette holder 40, it rotates about the shaft 40a to seat on the slider 50. At this time, the hubs of the tape cassette 20 are guided by the reels 53, 54, and, simultaneously, the lid-open member 44 on the side of the cassette holder 40 rotates clockwise about the shaft 44a to open the lid 20a of the tape cassette 20. If the cassette holder 40 is pushed toward the upper chassis 30, the slider transportation apparatus mounted on the upper chassis 30 horizontally transports the slider 50 toward the upper chassis 30 to enable the loading operation of the magnetic tape with respect to the rotary drum 31.

FIG. 2 shows the state of the device after the first stage of the loading process. Thereafter, when the eject lever 10 is pressed down by a user, it pivots about the shaft 11a. The pin 10c on lever 10 presses down on the chassis 30 via elongated opening 30b, thereby causing the chassis 30 to move downward via the elastic member 61 onto the lower chassis 60. As the lever 10 reaches its lowest point the locking pin 10b at the end of lever 10 is hooked and locked by the locking device 70 on the lower chassis 60.

Since the reels 53 and 54 move downward to be seated on the lower chassis 60, the reels must be accurately guided to the lower chassis 60, and the tape cassette 20 should not become loose within the holder; i.e., the tape cassette should not float within the tape cassette holder. Moreover, overall units for horizontally placing the reels at a predetermined height about the lower chassis and generating reel pulses for indicating the remaining amount of magnetic tape are not provided.

SUMMARY OF THE INVENTION

It is an object of the present invention to solve the above-described problems by providing a reel guide apparatus of a magnetic recording/reproducing apparatus, wherein a slider mounted with a supply reel and a take-up reel is accurately guided and seated on a lower chassis, the reels are accurately maintained over the lower chassis by a predetermined height, and reel pulses for calculating the remaining amount of tape are produced.

To achieve the above object of the present invention, there is provided a reel guide apparatus of a magnetic recording/reproducing apparatus including an upper chassis, which has a cassette holder and a cassette mounting unit formed of a pair of reel bases with a tape supply reel and a take-up reel for allowing the tape cassette to be inserted toward a rotary drum, the upper chassis vertically descending to be seated on a lower chassis. The reel guide apparatus includes a supply reel guide unit for stably guiding the upwardly and downwardly moving supply reel in the vertical direction, a take-up reel guide unit for stably guiding the upwardly and downwardly moving take-up reel in the vertical direction, and a position decision unit integrally formed with the reel guide unit for determining the seating position of the tape cassette on the lower chassis. Preferably, the supply reel and take-up reel guide units have reel base guides, the ends of which are inserted into the reel bases for guiding the reel bases, and at least one reel base supporter, which supports the lower portion of respective reel bases and determines the height from the lower chassis to the reel base. The reel base guide preferably includes reel sensors for generating reel pulses and reflectors formed on the lower side of the respective reels to cooperate with the reel sensors in the generation of reel pulses.

BRIEF DESCRIPTION OF THE DRAWINGS

The above objects and other advantages of the present invention will become more apparent from the following description of a preferred embodiment of the invention with reference to the attached drawings in which:

FIGS. 3–7 are various views of the preferred embodiment of the present invention;

FIG. 3 is a plan view of a lower chassis of a magnetic recording/reproducing apparatus with a reel guide apparatus mounted thereon;

FIG. 4 is a plan view of a slider with tape reels installed thereon;

FIG. 5 is a view schematically showing the reel sensors and the reflectors;

FIG. 6 is an enlarged view of the tape reels and the reel guide prior to the tape reels being seated on the reel guide apparatus; and FIG. 7 is an enlarged view of the tape reels and the reel guide after the tape reels are seated on the reel guide apparatus.

DETAILED DESCRIPTION OF THE PREFERRED EMBODIMENT

Figure 1:
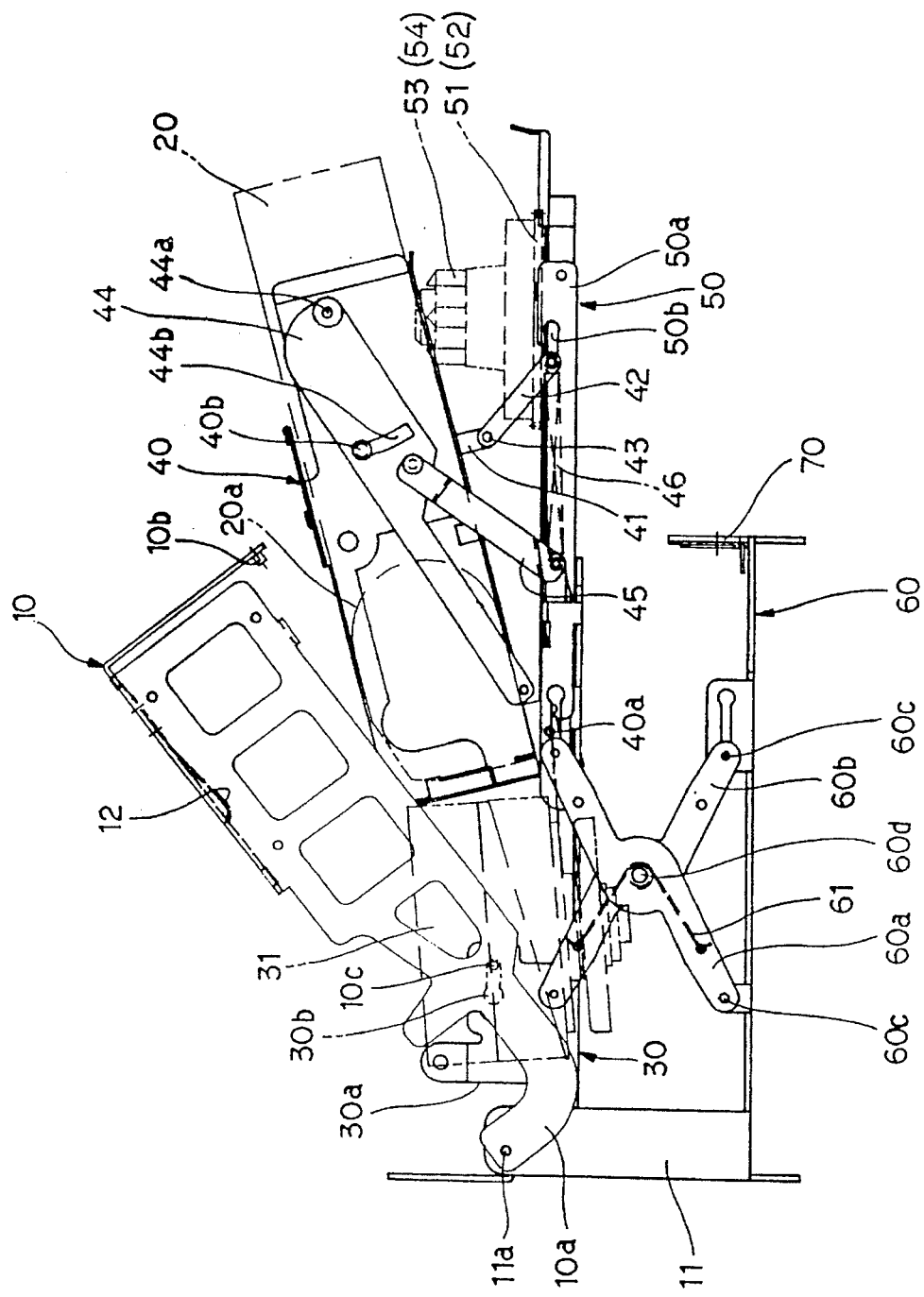
FIG. 1 is a schematic side view of a conventional reel guide apparatus for a magnetic recording/reproducing apparatus.
Figure 2:
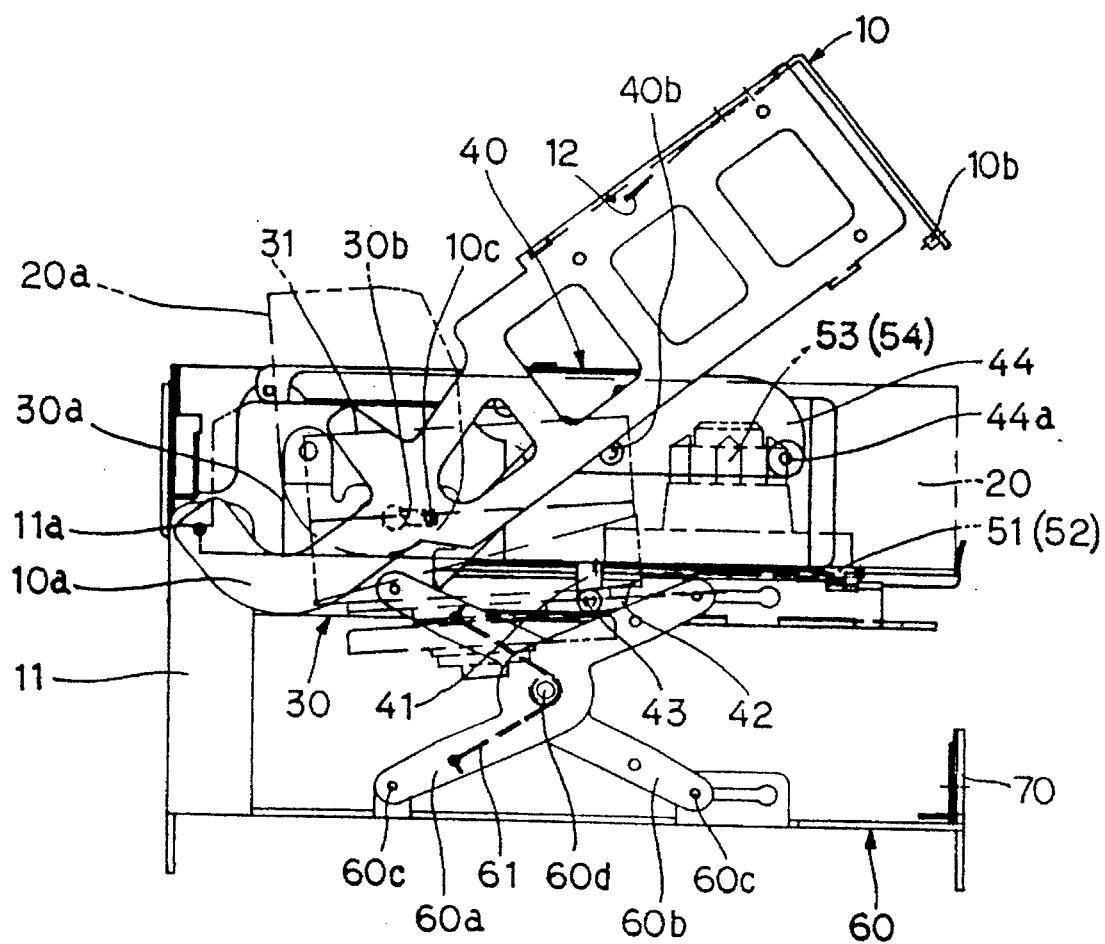
FIG. 2 is a schematic side view of the device of FIG. 1 in a state following initial loading.

One embodiment of a reel guide apparatus of a magnetic recording/reproducing apparatus according to the present invention will now be described in detail. Reference numerals which are used to designate parts in FIGS. 1 and 2 are also used in FIGS. 3–7 to designate corresponding parts used in the embodiment of the invention. Such common parts will not be described further in detail. Also, it should be understood that while FIGS. 1 and 2 represent the conventional apparatus, the reel guide apparatus of the present invention is used in conjunction with the apparatus of FIGS. 1 and 2 in the preferred embodiment, as will be apparent from the description of the operation of the preferred embodiment to be explained subsequently.

Figure 3:
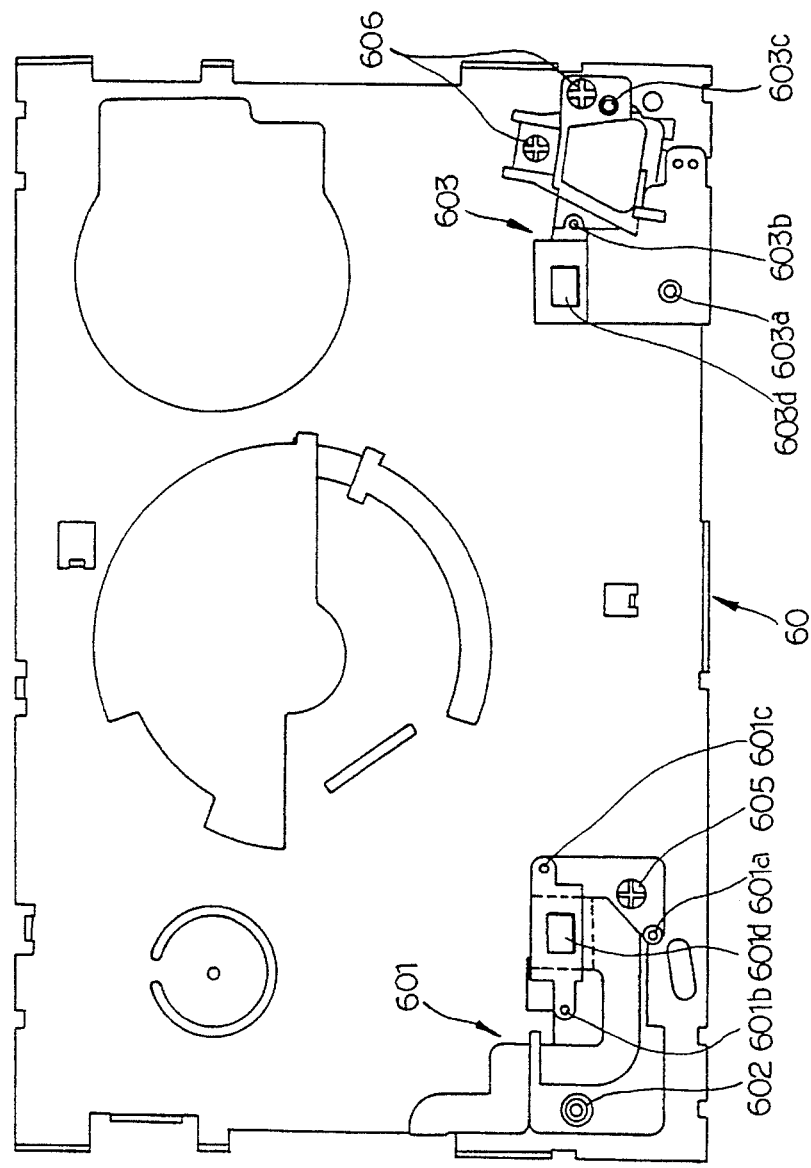

A lower chassis 60 with reel guide apparatus according to the present invention is shown in FIG. 3. Supply reel and take-up reel guide units 601 and 603 for vertically and stably guiding a supply reel 53 and a take-up reel 54, respectively, are fixed by means of screws 605 and 606 to both sides of the lower chassis 60.

As shown in FIGS. 6 and 7, the supply reel guide unit 601 includes a reel base guider 601a, two reel base supporters 601b and 601c, and a reel sensor 601d. The reel base guider 601a is inserted at one end thereof into a supply reel base 51 for guiding the supply reel base 51. The reel base supporters 601b and 601c support the lower portion of the supply reel base 51 at a predetermined height above the lower chassis 60. The reel sensor 601d is installed on the supply reel base guider 601a and generates reel pulses. A position decision unit 602 for determining the seating position of a tape cassette 20 is positioned on the lower chassis 60 to one side of the supply reel guide unit 601.

The take-up reel guide unit 603 has a reel base guider 603a, reel base supporters 603b and 603c, and a reel sensor 603d. The reel base guider 603a has one end which is inserted into a take-up reel base 52 for guiding the take-up reel base 52. The reel base supporters 603b and 603c support the lower portion of the take-up reel base 52 at a predetermined height above the lower chassis 60. The reel sensor 603d is installed on the supply reel base guider 603a as shown in FIG. 6 and operates to generate reel pulses.

A pair of black and white split disc reflectors 53a and 54a are mounted on the lower portions of the supply reel 53 and take-up reel 54, respectively. The pair of split disc reflectors cooperate with the reel sensors 601d and 603d to permit the generation of the reel pulses in the state shown in FIG. 7.

Figure 4:
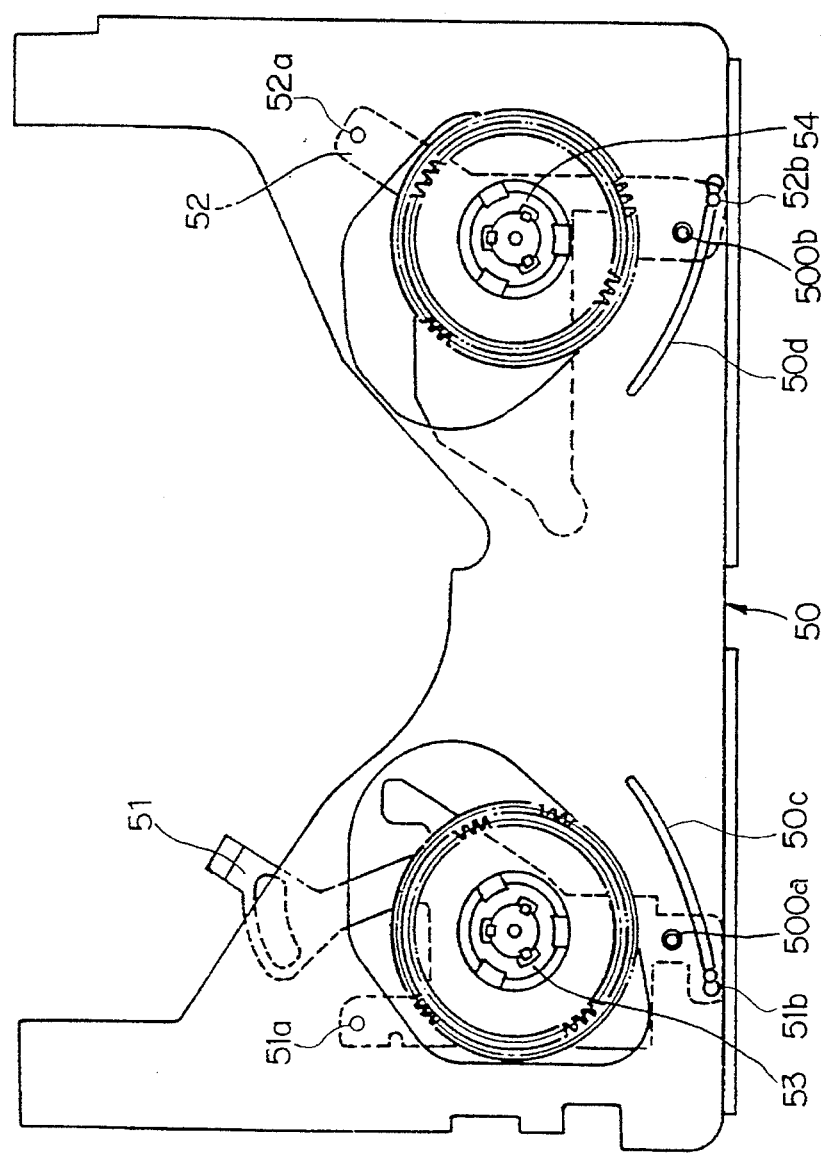

FIG. 4 is a plan view of the slider 50 with the supply reel 53 and take-up reel 54 installed thereon. The reels 53 and 54 are fixed on the reel bases 51 and 52 and pivot with the reel bases as the latter are pivoted. The reel base guiders 601a and 603a shown in FIG. 6 are inserted into the holes 500a and 500b formed in the reel bases 51 and 52, respectively, shown in FIG. 4, thereby guiding (fixing the position of) the reel bases 51 and 52. Each of the reel bases can be pivoted about it respective axes 51a and 52a in order to properly seat the reels on the reel guides. To permit such pivoting, pins 51b and 52b ride in slots 50c and 50d, respectively, in the slider 50. Also, a spring 50e is connected between the two reel bases.

Figure 5:
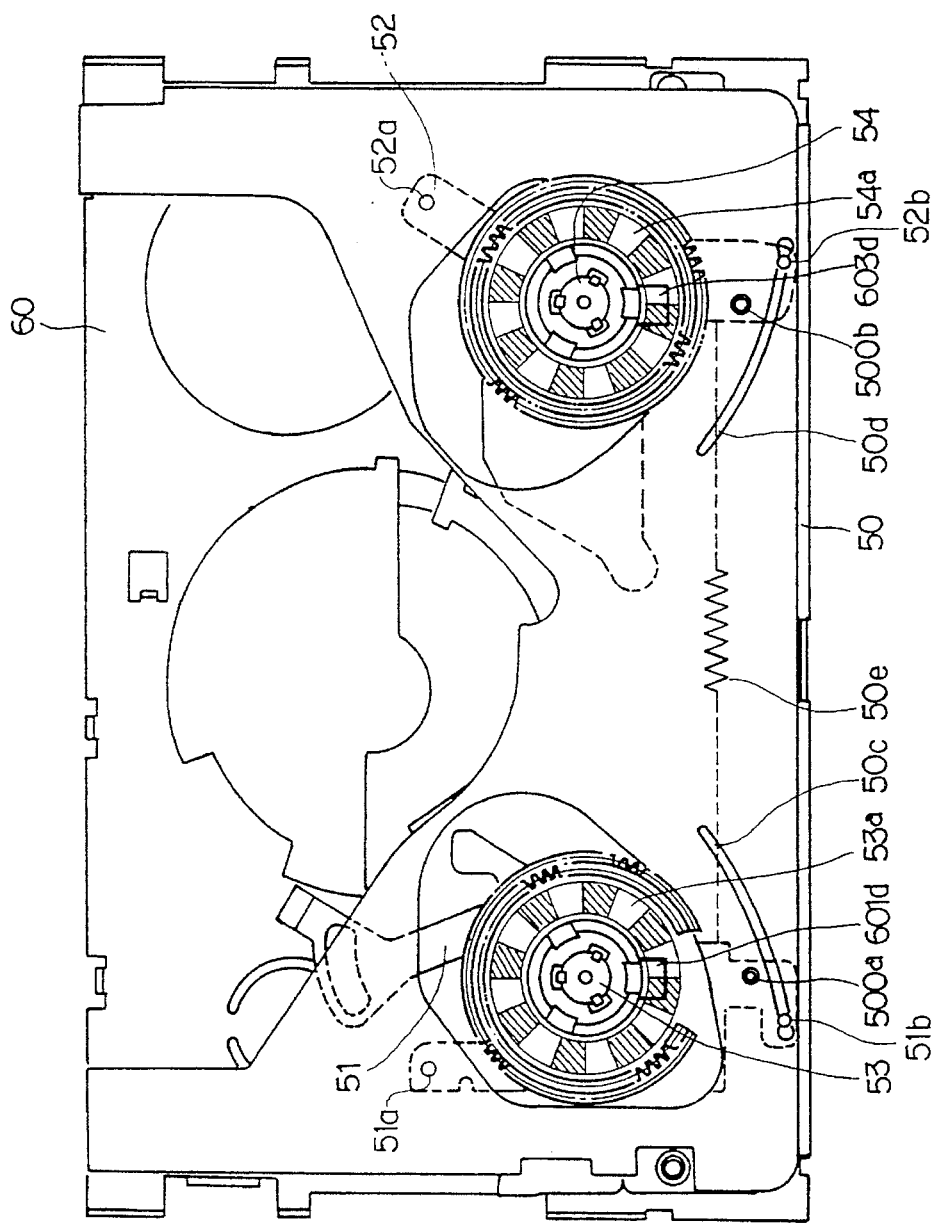

FIG. 5 is a schematic plan view showing the slider 50 accurately seated on the lower chassis 60 by means of the reel base guiders 601a and 603a being inserted in holes 500a and 500b. The reel sensors 601d and 603d and reflectors 53a and 54a are shown in this Figure. The reel sensors 601d and 603d are disposed on the lower side of the black and white split disc reflectors 53a and 54a to generate accurately the reel pulses.

In operation, as shown in FIG. 1, after the cassette holder 40 has a cassette inserted therein, the holder 40 is pressed closed (downward) and seated on the slider 50. This operation causes the lid-open member 44 to open the cassette lid 20a as shown in FIG. 2. The user then pushes the slider 50 toward the rotary drum 31, causing the slider 50 to move swiftly toward the rotary drum 31 with the elasticity caused by the slider transportation apparatus. The reel bases 51 and 52 maintain their positions shown in FIG. 4 by means of stoppers not shown in the drawings. If the user then presses downwardly on the eject lever 10, the upper chassis 30 is moved downwardly toward the lower chassis 60, in the manner illustrated in FIG. 6.

In FIG. 6, the upper chassis 30 is not illustrated, but it will be apparent that the upper chassis 30 and the slider 50 move downwardly together. After the downward movement of the slider 50 is finished, as shown in FIG. 7, the lower portions of the reel bases 51 and 52 are firmly supported by the reel base supporters 601b, 601c, 603b and 603c, which fix the height of the reel bases 51 and 53 above the lower chassis. Also, the ends of the reel base guiders 601a and 603a are inserted into the holes 500a and 500b in the reel bases 51 and 52 (refer to FIGS. 4 and 5), and shoulders of the reel base guiders also support the lower portions of the reel bases 51 and 52. Simultaneously, the end of the position decision unit 602 for determining the seating position of the tape cassette 20 abuts an indentation on the edge of the tape cassette 20 to accurately guide the seating of the tape cassette. Alternatively, the position decision unit 602 may be integral with the take up reel guide unit 603.

During a record or reproduction operation, the reflectors 53a and 54a on the lower portion of the reels 53 and 54 are rotated along with the rotated reels 53 and 54. Optical rays produced from the reel sensors 601d and 603d are selectively reflected back to the reel sensors and detected thereby, resulting in the generation of reel pulses that represent rotation of the reels. The reel pulses are transmitted to a control circuit (not shown) via an electrical connector 604 for carrying out calculation of the remaining amount of the tape, etc.

To eject the tape cassette, the locked eject lever 10 is released. The slider 50 moves from the state shown in FIG. 7 to the state shown in FIG. 6 due to the elastic and repulsive force of the fourth and fifth links 60a and 60b. Thus, the slider is released from the lower chassis 60. The ejector lever 10 is raised by the action of elongated opening 30b on pin 10c, and the holder 40 is raised by the action of elastic member 46 on links 45 and 42.

In the reel guide apparatus according to the present invention, reels are accurately placed during the loading of a tape cassette, and reflectors are accurately maintained on the lower sides of reels facing reel sensors. As a result of the accurate placement of the reels during loading, the seating operation of the tape cassette with respect to a lower chassis can be stably performed. As a result of the placement of the reflectors and the sensors, reel pulses can be accurately generated.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. In a magnetic recording/reproducing apparatus of the type having; an upper chassis including a cassette holder for receiving a tape cassette, a slider on which are installed a pair of reel bases and reel hubs for receiving and supporting the reels of said tape cassette, a rotary drum; a lower chassis; and mechanisms for lowering said upper chassis toward said lower chassis to seat said upper chassis on said lower chassis; the improvement comprising:

reel guides on said lower chassis;

each said reel guide having a protrusion pointing towards said upper chassis;

holes in said reel bases at positions corresponding to said protrusions, whereby when said upper chassis is lowered onto said lower chassis, said protrusions enter said holes respectively, to properly position said upper chassis on said lower chassis; and tape cassette position determining element on said lower chassis for stably positioning said tape cassette when said upper chassis in seated on said lower chassis.

2. Apparatus as claimed in claim 1, wherein there are two said reel guides, and wherein said pair of reel bases are a supply reel base and a take-up reel base; one of said reel guides provided to guide said supply reel base and the other of said reel guides provided to guide said take-up reel base.

3. Apparatus as claimed in claim 2, wherein each said reel guide further comprises reel base supporters positioned on said lower chassis and extending upward a fixed distance from said lower chassis, whereby when said upper chassis is lowered onto said lower chassis, said reel supporters support said upper chassis at a fixed height above said lower chassis.

4. Apparatus as claimed in claim 3, wherein said holes in said upper chassis are holes in said slider.

5. Apparatus as claimed in claim 4, wherein said tape cassette position determining element is a protrusion extending from said lower chassis up into said upper chassis when the latter is seated on said lower chassis; said latter protrusion providing an abutment for an indentation on said tape cassette.

6. Apparatus as claimed in claim 5, wherein each said reel has a reflector on the surface thereof which faces said lower chassis, and further comprising a sensor on each said reel guide for generating reel pulses in cooperation with said reflectors.

7. Apparatus as claimed in claim 6, wherein each said reflector is a split disc black and white reflector.

8. Apparatus as claimed in claim 5, wherein said tape cassette position determining element is integral with one of said reel guides.

* * * * *